(12) United States Patent
Ichikawa et al.

(10) Patent No.: US 9,283,859 B2
(45) Date of Patent: Mar. 15, 2016

(54) POWER RECEIVING DEVICE, POWER TRANSMITTING DEVICE, VEHICLE, AND CONTACTLESS POWER SUPPLY SYSTEM

(75) Inventors: Shinji Ichikawa, Toyota (JP); Toru Nakamura, Toyota (JP); Kouji Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 14/124,910

(22) PCT Filed: Jun. 14, 2012

(86) PCT No.: PCT/IB2012/001154
§ 371 (c)(1),
(2), (4) Date: Dec. 9, 2013

(87) PCT Pub. No.: WO2012/172409
PCT Pub. Date: Dec. 20, 2012

(65) Prior Publication Data
US 2014/0132212 A1 May 15, 2014

(30) Foreign Application Priority Data
Jun. 17, 2011 (JP) .................................. 2011-135016

(51) Int. Cl.
H02J 7/00 (2006.01)
B60L 11/18 (2006.01)
H02J 7/02 (2006.01)
H02J 17/00 (2006.01)
B60L 7/14 (2006.01)
B60L 11/12 (2006.01)
B60L 11/14 (2006.01)
B60L 15/00 (2006.01)
H02J 5/00 (2006.01)
H02H 7/18 (2006.01)

(52) U.S. Cl.
CPC ................. *B60L 11/182* (2013.01); *B60L 7/14* (2013.01); *B60L 11/123* (2013.01); *B60L 11/14* (2013.01); *B60L 11/1812* (2013.01); *B60L 11/1833* (2013.01); *B60L 11/1846* (2013.01); *B60L 15/007* (2013.01); *H02J 5/005* (2013.01); *H02J 7/025* (2013.01); *H02J 17/00* (2013.01); *B60L 2210/40* (2013.01); *H02H 7/18* (2013.01); *Y02T 10/6217* (2013.01); *Y02T 10/7005* (2013.01); *Y02T 10/7011* (2013.01); *Y02T 10/7077* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ........ H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS

| | | | |
|---|---|---|---|
| 5,654,621 A | * | 8/1997 | Seelig ............................ 320/108 |
| 2010/0033135 A1 | * | 2/2010 | Nishida et al. ................. 320/136 |
| 2010/0225271 A1 | * | 9/2010 | Oyobe et al. ................... 320/108 |
| 2011/0181123 A1 | | 7/2011 | Ichikawa |
| 2012/0043172 A1 | | 2/2012 | Ichikawa |

FOREIGN PATENT DOCUMENTS

| | | |
|---|---|---|
| JP | A-2009-130940 | 6/2006 |
| JP | A-2009-189153 | 8/2009 |
| WO | WO 2010/041318 A1 | 4/2010 |
| WO | WO 2010/131346 A1 | 11/2010 |

* cited by examiner

*Primary Examiner* — Arun Williams
(74) *Attorney, Agent, or Firm* — Oliff PLC (57) ABSTRACT

A power supply system includes: a power transmitting device that includes a power transmitting unit; and a vehicle that includes a power receiving unit, and contactlessly transfers electric power between the power transmitting device and the vehicle through electromagnetic resonance. When there is an abnormality that a power receiving mechanism of the vehicle cannot receive electric power, a vehicle ECU causes the power transmitting device to stop power transmission, opens a relay and further discharges remaining electric power by the discharging unit.

11 Claims, 6 Drawing Sheets

POWER RECEIVING DEVICE, POWER TRANSMITTING DEVICE, VEHICLE, AND CONTACTLESS POWER SUPPLY SYSTEM

BACKGROUND OF THE INVENTION

1. Field of the Invention

The invention relates to a power receiving device, a power transmitting device, a vehicle and a contactless power supply system and, more particularly, to a contactless power supply technique for transferring electric power using electromagnetic resonance.

2. Description of Related Art

Vehicles, such as electric vehicles and hybrid vehicles, become a focus of attention as environmentally friendly vehicles. These vehicles each include an electric motor that generates running driving force and a rechargeable electrical storage device that stores electric power supplied to the electric motor. Note that the hybrid vehicles include a vehicle that further includes an internal combustion engine together with an electric motor as a power source, a vehicle that further includes a fuel cell together with an electrical storage device as a direct-current power supply for driving the vehicle, and the like.

In recent years, wireless power transmission that does not use a power cord or a power transmission cable becomes a focus of attention as a method of transmitting electric power from a power supply outside a vehicle to such a vehicle. Three leading techniques are known as the wireless power transmission technique. The three leading techniques are power transmission using electromagnetic induction, power transmission using electromagnetic wave such as a microwave and power transmission using a resonance method.

The resonance method is a contactless power transmission technique such that a pair of resonators (for example, a pair of resonance coils) are resonated in an electromagnetic field (near field) to thereby transmit electric power via the electromagnetic field. The resonance method is able to transmit large electric power of several kilowatts over a relatively long distance (for example, several meters).

Japanese Patent Application Publication No. 2009-130940 (JP 2009-130940 A) describes a configuration that, in a vehicle of which a mounted electrical storage device is chargeable from a power supply outside the vehicle via a charging cable, the residual electric charge of a capacitor provided between a pair of power lines that receive charging electric power is discharged by a discharging resistor for discharging the residual electric charge of a capacitor connected to an in-vehicle inverter.

At the time of transferring electric power in the power supply system, when there is an abnormality that a power receiving device cannot receive electric power, power transmission from a power transmitting device needs to be quickly stopped. However, in power transfer using a resonance method, electromagnetic energy resulting from resonance remains at the portions of resonance coils that are carrying out electromagnetic resonance. Therefore, even when the power receiving device stops receiving electric power, the remaining energy can be transmitted to the power receiving device.

Then, electric power is further supplied to the device having an abnormality or electric power that has nowhere to go continues to resonate between the power transmitting device and the power receiving device. This may cause degradation or breakage of devices or may influence surroundings.

SUMMARY OF THE INVENTION

The invention provides a contactless power supply system that transfers electric power through electromagnetic resonance and that, when there is an abnormality in a power receiving device, appropriately protects a power transmitting device.

A first aspect of the invention relates to a power receiving device for contactlessly receiving electric power, transferred from a power transmitting device, through electromagnetic resonance. The power receiving device includes: a power receiving unit that carries out electromagnetic resonance with a power transmitting unit included in the power transmitting device to thereby receive electric power from the power transmitting device; and a discharging unit that, when there is an abnormality in the power receiving device, discharges received electric power received by the power receiving unit.

The power receiving device may further include an electrical storage device that stores the received electric power, and, the discharging unit may consume the received electric power to suppress supply of the received electric power to the electrical storage device when there is an abnormality in the power receiving device.

In the power receiving device, the discharging unit may include a resistor that discharges the received electric power. In the power receiving device, the resistor may be used at the time of determining a relative position between the power transmitting device and the power receiving device.

The power receiving device may further include a control unit that controls the discharging unit, the discharging unit may further include a first switching unit that is connected in series with the resistor, and the control unit may place the first switching unit in a conductive state when the received electric power is discharged, and may place the first switching unit in a non-conductive state when the received electric power is not discharged.

The power receiving device may further include a rectifier that rectifies the received electric power, and the discharging unit may be connected between a pair of power lines that connect the rectifier to the electrical storage device.

The power receiving device may further include a control unit that controls the discharging unit and a second switching unit that is provided in one of the power lines that connect the discharging unit to the electrical storage device, and the control unit may place the second switching unit in a conductive state when the electrical storage device is charged with the received electric power, and may place the second switching unit in a non-conductive state when the received electric power is discharged.

The power receiving device may further include a rectifier that rectifies the received electric power, and the discharging unit may be connected between a pair of power lines that connect the power receiving unit to the rectifier.

The power receiving device may further include a control unit that controls the discharging unit and a second switching unit that is provided in one of the power lines that connect the discharging unit to the rectifier, and the control unit may place the second switching unit in a conductive state when the electrical storage device is charged with the received electric power, and may place the second switching unit in a non-conductive state when the received electric power is discharged.

In the power receiving device, the control unit may place the first switching unit in the non-conductive state when a predetermined period of time during which the received electric power is discharged by the discharging unit to a level below a predetermined threshold from when the first switching unit is placed in the conductive state has elapsed.

A second aspect of the invention relates to a vehicle. The vehicle includes: any one of the above described power receiving devices; and a driving device that uses electric power received by the power receiving device to generate running driving force.

A third aspect of the invention relates to a power transmitting device for contactlessly transferring electric power to a power receiving device through electromagnetic resonance. The power transmitting device includes: a power transmitting unit that carries out electromagnetic resonance with a power receiving unit included in the power receiving device to transfer electric power; a power supply device that supplies electric power to the power, transmitting unit; and a control unit that controls power transmission in the power supply device. The power receiving device includes a discharging unit that discharges received electric power received by the power receiving unit when there is an abnormality in the power receiving device, and, the control unit stops the power transmission in response to a signal that indicates instructions for stopping the power transmission and that is received from the power receiving device when the received electric power is discharged by the discharging unit.

A fourth aspect of the invention relates to a contactless power supply system for contactlessly transferring electric power through electromagnetic resonance. The contactless power supply system includes: a power transmitting device that includes a power transmitting unit; a power receiving device that includes a power receiving unit that carries out electromagnetic resonance with the power transmitting unit; and a control unit that controls transfer of electric power from the power transmitting device to the power receiving device. The power receiving device includes a discharging unit that discharges received electric power received by the power receiving unit when there is an abnormality in the power receiving device.

According to the aspects of the invention, in the contactless power supply system that transfers electric power through electromagnetic resonance, when there is an abnormality in the power receiving device, it is possible to appropriately protect the power receiving device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Note that like reference numerals denote the same or corresponding components in the drawings, and the description thereof is not repeated.

First Embodiment

Figure 1:
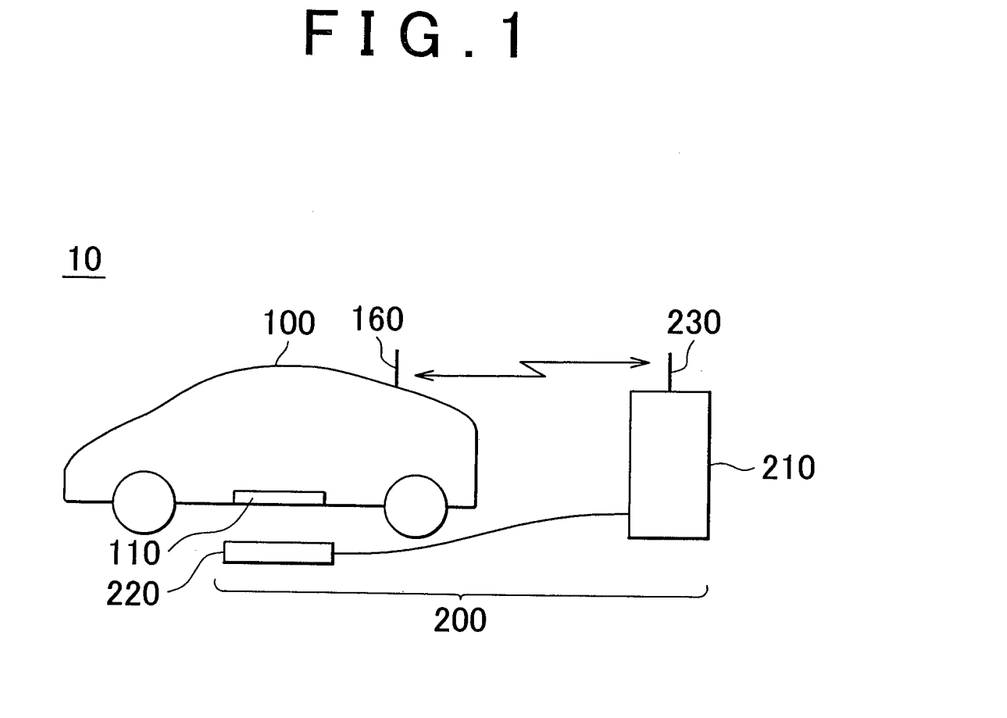
FIG. 1 is an overall schematic view of a power supply system for a vehicle according to a first embodiment of the invention.

FIG. 1 is an overall schematic view of a power supply system 10 for a vehicle according to a first embodiment of the invention. As shown in FIG. 1, the power supply system 10 includes a vehicle 100 and a power transmitting device 200. The vehicle 100 includes a power receiving unit 110 and a communication unit 160. The power transmitting device 200 includes a power supply device 210 and a power transmitting unit 220. In addition, the power supply device 210 includes a communication unit 230.

The power receiving unit 110 is, for example, provided at a vehicle bottom face, and is configured to contactlessly receive electric power transmitted from the power transmitting unit 220 of the power transmitting device 200. More specifically, as will be described in FIG. 2, the power receiving unit 110 includes a resonance coil, and resonates with a resonance coil, included in the power transmitting unit 220, using an electromagnetic field to thereby contactlessly receive electric power from the power transmitting unit 220. The communication unit 160 is a communication interface for carrying out wireless communication between the vehicle 100 and the power transmitting device 200.

The power supply device 210 of the power transmitting device 200, for example, converts alternating-current power, supplied from a commercial power supply, to high-frequency electric power and then outputs the high-frequency electric power to the power transmitting unit 220. Note that the frequency of high-frequency electric power generated by the power supply device 210 is, for example, 1 MHz to several tens of MHz.

The power transmitting unit 220 is provided on a floor surface of a parking 10, or the like, and is configured to contactlessly transmit high-frequency electric power, supplied from the power supply device 210, to the power receiving unit 110 of the vehicle 100. More specifically, the power transmitting unit 220 includes the resonance coil, and resonates with the resonance coil, included in the power receiving unit 110, using an electromagnetic field to thereby contactlessly transmit electric power to the power receiving unit 110. The communication unit 230 is a communication interface for carrying out wireless communication between the power transmitting device 200 and the vehicle 100.

Figure 2:
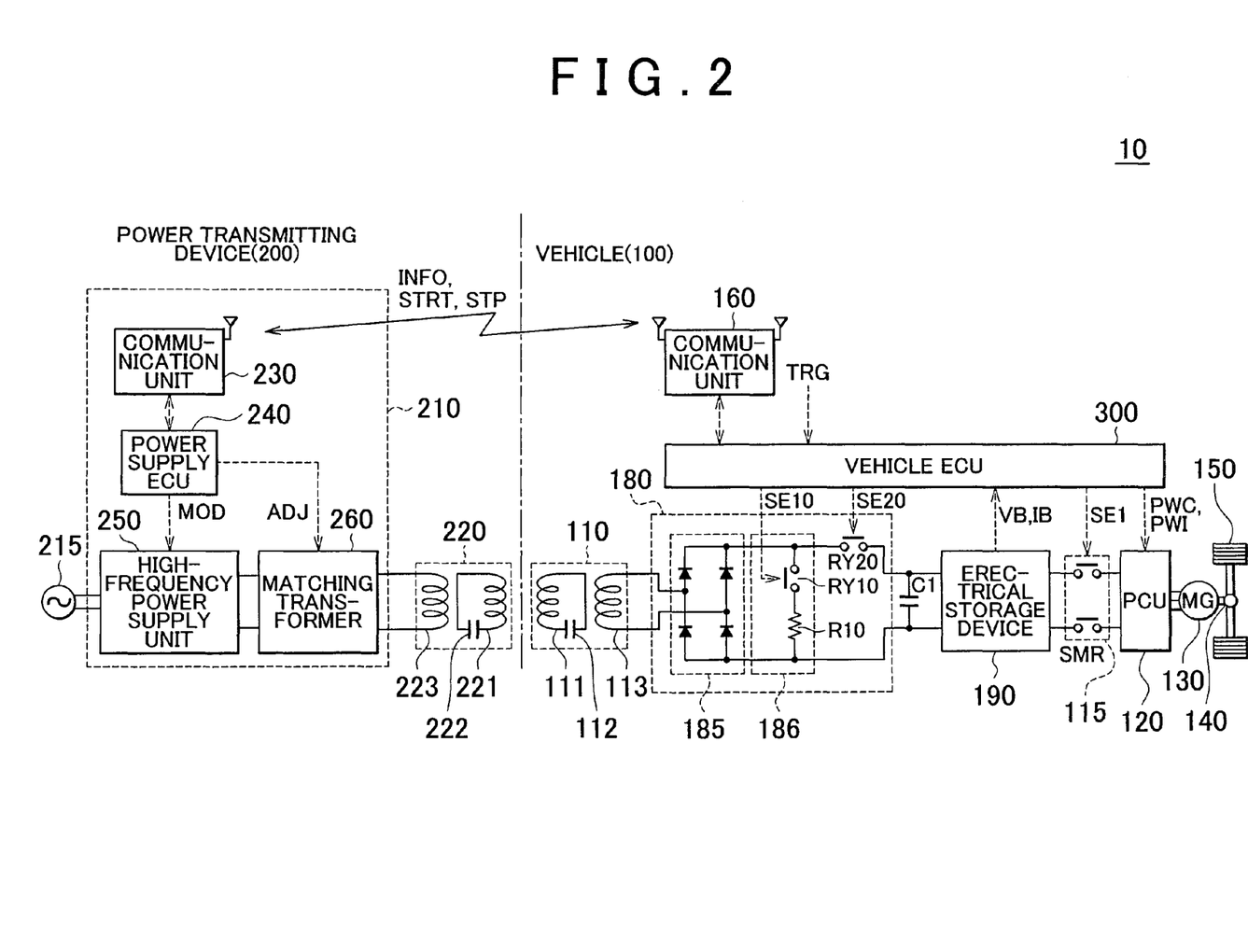
FIG. 2 is a detailed configuration view of the power supply system shown in FIG. 1.

FIG. 2 is a detailed configuration view of the power supply system 10 shown in FIG. 1. As shown in FIG. 2, the vehicle 100 includes a rectifying unit 180, a capacitor C1, an electrical storage device 190, a system main relay (SMR) 115, a power control unit (PCU) 120, a motor generator 130, a power transmission gear 140, drive wheels 150 and a vehicle electronic control unit (ECU) 300 that serves as a control unit, in addition to the power receiving unit 110 and the communication unit 160. The power receiving unit 110 includes a secondary resonance coil 111, a capacitor 112 and a secondary coil 113. The rectifying unit 180 includes a rectifier 185, a discharging unit 186 and a relay RY20.

Note that, in the present embodiment, an electric vehicle is, for example, described as the vehicle 100; however, the configuration of the vehicle 100 is not limited to the electric vehicle as long as the vehicle is able to run using electric power stored in the electrical storage device. Another example of the vehicle 100 includes a hybrid vehicle equipped with an engine, a fuel cell vehicle equipped with a fuel cell, and the like.

The secondary resonance coil 111 receives electric power from a primary resonance coil 221, included in the power transmitting device 200, through electromagnetic resonance using an electromagnetic field.

The number of turns of the secondary resonance coil 111 is appropriately set on the basis of the distance from the primary resonance coil 221 of the power transmitting device 200, the resonance frequency between the primary resonance coil 221 and the secondary resonance coil 111, and the like, such that a Q value (for example, Q>100) that indicates resonance strength between the primary resonance coil 221 and the secondary resonance coil 111, κ that indicates the degree of coupling therebetween, and the like, increase.

The capacitor 112 is connected to both ends of the secondary resonance coil 111, and forms an LC resonance circuit together with the secondary resonance coil 111. The capacitance of the capacitor 112 is appropriately set so as to attain a predetermined resonance frequency on the basis of the inductance of the secondary resonance coil 111. Note that, when a desired resonance frequency is obtained by a stray capacitance of the secondary resonance coil 111 itself, the capacitor 112 may be omitted.

The secondary coil 113 is provided coaxially with the secondary resonance coil 111, and is able to be magnetically coupled to the secondary resonance coil 111 through electromagnetic induction. The secondary coil 113 extracts electric power, received by the secondary resonance coil 111, through electromagnetic induction and outputs the electric power to the rectifier 185.

The rectifier 185 is typically configured as a diode bridge. The rectifier 185 rectifies alternating-current power received from the secondary coil 113, and outputs the rectified direct-current power to the electrical storage device 190. The rectifier 185 may be a so-called switching regulator that rectifies alternating current using switching control Note that, in the present embodiment, direct-current power rectified by the rectifier 185 is directly output to the electrical storage device 190; however, when a rectified direct-current voltage differs from a charging voltage that is allowed by the electrical storage device 190, a DC/DC converter (not shown) for voltage conversion may be provided between the rectifier 185 and the electrical storage device 190.

The discharging unit 186, for example, has a configuration such that a relay RY10 and a resistor R10 are connected in series with each other and are connected between a pair of power lines that connect the rectifier 185 to the electrical storage device 190. As will be described later, for example, when there is an abnormality in the electrical storage device 190 and the electrical storage device 190 cannot be charged, the discharging unit 186 consumes remaining electric power using the resistor R10 after stop of power transmission so as not to supply the electric power to the electrical storage device 190.

The relay RY10 of the discharging unit 186 is controlled by a control signal SE10 from the vehicle ECU 300. As described above, when there is an abnormality that the power receiving mechanism of the vehicle 100 cannot receive electric power, the relay RY10 is closed. The resistor R10 consumes remaining electric power when the relay RY10 is closed. Note that, instead of the resistor R10, another element or mechanism that is able to consume electric power may be employed. In addition, depending on a vehicle, in order to determine the distance between the power transmitting unit 220 of the power transmitting device 200 and the power receiving unit 110 of the vehicle 100, a resistor for monitoring a received voltage may be provided to the vehicle as a similar configuration to that of the discharging unit 186. In such a vehicle, the above resistor for determining the distance is also used as the resistor R10 of the discharging unit 186 to thereby make it possible to suppress an increase in the number of components and, as a result, suppress an increase in cost.

The relay RY20 is inserted in one of the power lines that connect the discharging unit 186 to the electrical storage device 190. The relay RY20 is controlled by a control signal SE20 from the vehicle ECU 300. The relay RY20 switches between supply and interruption of received electric power to the electrical storage device 190.

The capacitor C1 is connected between the positive terminal and negative terminal of the electrical storage device 190. The capacitor C1 smoothes direct-current voltage rectified by the rectifying unit 180.

The electrical storage device 190 is an electric power storage element that is configured to be chargeable and dischargeable. The electrical storage device 190 is, for example, formed of a secondary battery, such as a lithium ion battery, a nickel-metal hydride battery and a lead-acid battery, or an electrical storage element, such as an electric double layer capacitor.

The electrical storage device 190 is connected to the rectifying unit 180. The electrical storage device 190 stores electric power that is received by the power receiving unit 110 and that is further rectified by the rectifying unit 180. In addition, the electrical storage device 190 is also connected to the PCU 120 via the SMR 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

A voltage sensor and a current sensor (both are not shown) are provided for the electrical storage device 190. The voltage sensor is used to detect the voltage VB of the electrical storage device 190. The current sensor is used to detect a current IB input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The SMR 115 is inserted in power lines that connect the electrical storage device 190 to the PCU 120. Then, the SMR 115 is controlled by a control signal SE1 from the vehicle ECU 300, and switches between supply and interruption of electric power between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 using electric power converted by the converter.

The motor generator 130 is an alternating-current rotating electrical machine, and is, for example, a permanent-magnet synchronous motor that includes a rotor in which a permanent magnet is embedded.

The output torque of the motor generator 130 is transmitted to the drive wheels 150 via the power transmission gear 140 to drive the vehicle 100. The motor generator 130 is able to generate electric power using the rotational force, of the drive wheels 150 during regenerative braking operation of the vehicle 100. Then, the generated electric power is converted by the PCU 120 to charging electric power to charge the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated from the rotation of the engine.

As described above, the communication unit 160 is a communication interface for carrying out wireless communication between the vehicle 100 and the power transmitting device 200. The communication unit 160 outputs battery information INFO about the electrical storage device 190, including the SOC, from the vehicle ECU 300 to the power transmitting device 200. In addition, the communication unit 160 outputs a signal STRT or STP, which instructs the power transmitting device 200 to start or stop transmission of electric power, to the power transmitting device 200.

The vehicle ECU 300 includes a central processing unit (CPU), a storage unit and an input/output buffer, which are not shown in FIG. 1. The vehicle ECU 300 inputs signals from the sensors, and the like, outputs control signals to the devices, and controls the devices in the vehicle 100. Note that control over the vehicle 100 and the devices are not only limited to processing by software but may also be processed by exclusive hardware (electronic circuit).

When the vehicle ECU 300 receives a charge start signal TRG through user's operation, or the like, the vehicle ECU 300 outputs the signal STRT for instructions to start transmission of electric power to the power transmitting device 200 via the communication unit 160 on the basis of the fact that a predetermined condition is satisfied. In addition, the vehicle ECU 300 outputs the signal STP for instructions to stop transmission of electric power to the power transmitting device 200 via the communication unit 160 on the basis of the fact that the electrical storage device 190 is fully charged, user's operation, or the like.

Note that the configuration of the vehicle 100, other than the SMR 115, the PCU 120, the motor generator 130, the power transmission gear 140 and the drive wheels 150 that form a "driving device", may be regarded as a "power receiving device" according to the aspect of the invention.

As described above, the power transmitting device 200 includes the power supply device 210 and the power transmitting unit 220. The power supply device 210 further includes a power transmission ECU 240 that serves as a control unit, a high-frequency power supply unit 250 and a matching transformer 260 in addition to the communication unit 230. In addition, the power transmitting unit 220 includes the primary resonance coil 221, a capacitor 222 and a primary coil 223.

The high-frequency power supply unit 250 is controlled by a control signal MOD from the power transmission ECU 240, and converts electric power, received from an alternating-current power supply 215, such as a commercial power supply, to high-frequency electric power. Then, the high-frequency power supply unit 250 supplies the converted high-frequency electric power to the primary coil 223 via the matching transformer 260. Note that the frequency of high-frequency electric power generated by the high-frequency power supply unit 250 is, for example, 1 MHz to several tens of MHz.

Figure 3:
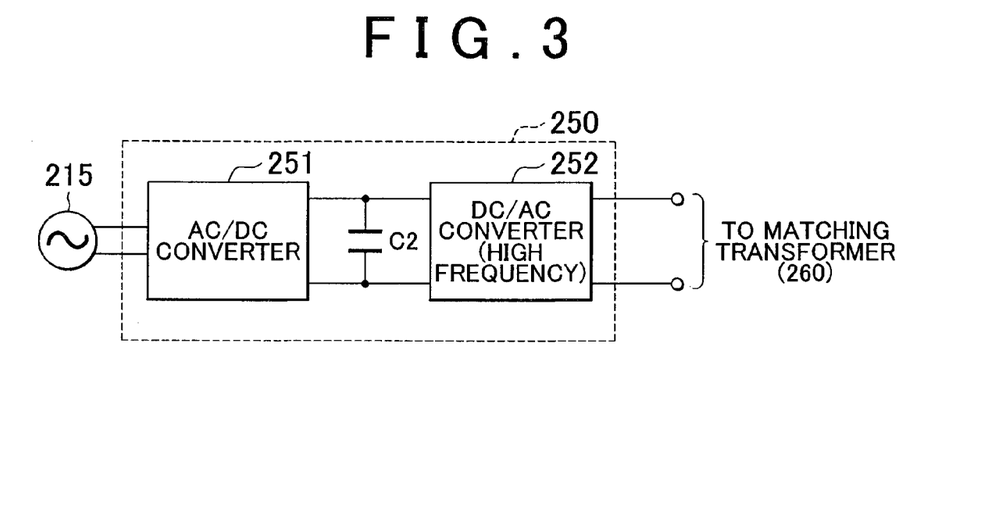
FIG. 3 is a view that shows an example of the internal configuration of a high-frequency power supply unit.

FIG. 3 is a view that shows an example of the internal configuration of the high-frequency power supply unit 250. The high-frequency power supply unit 250 includes an AC/DC converter 251, a DC/AC converter 252 and a capacitor C2. The AC/DC converter 251 converts alternating-current power from the external alternating-current power supply 215, such as a commercial power supply, to direct-current power. The DC/AC converter 252 converts direct-current power, converted by the AC/DC converter 251, to high-frequency alternating-current power. The capacitor C2 smoothes direct-current voltage output from the AC/DC converter 251.

Figure 4:
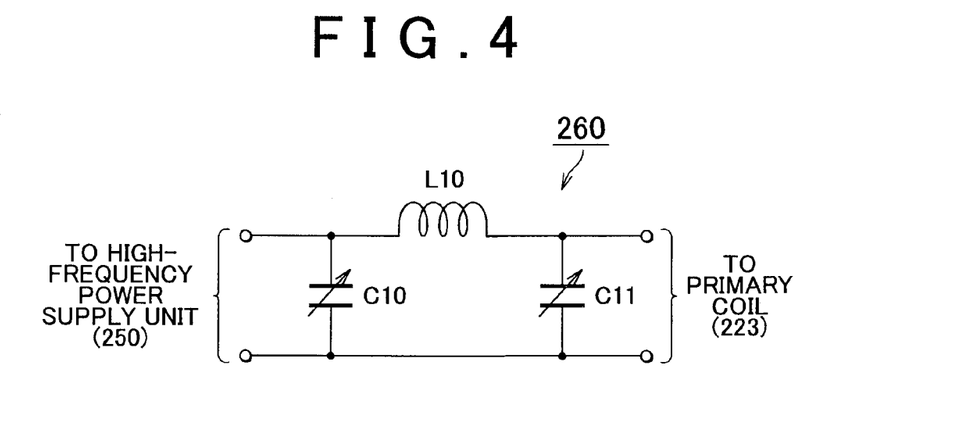
FIG. 4 is a view that shows an example of the internal configuration of a matching transformer.

The matching transformer 260 is a circuit for matching impedance between the power transmitting device 200 and the vehicle 100. For example, as shown in FIG. 4, the matching transformer 260 is configured to include variable capacitors C10 and C11 and an inductor L10. The inductor L10 is connected between the high-frequency power supply unit 250 and the primary coil 223 of the power transmitting unit 220. The variable capacitor C10 is connected to an end portion of the inductor L10, which is connected to the high-frequency power supply unit 250. In addition, the variable capacitor C11 is connected to an end portion of the inductor L10, which is connected to the power transmitting unit 220.

Referring back to FIG. 2, the matching transformer 260 is controlled by a control signal ADJ that is given from the power transmission ECU 240 on the basis of the battery information INFO transmitted from the vehicle 100, and the variable capacitors C10 and C11 are adjusted so as to match the impedance of the power transmitting device 200 to the impedance of the side of the vehicle 100.

The primary resonance coil 221 transfers electric power to the secondary resonance coil 111, included in the power receiving unit 110 of the vehicle 100, through electromagnetic resonance.

The number of turns of the primary resonance coil 221 is appropriately set on the basis of the distance from the secondary resonance coil 111 of the vehicle 100, the resonance frequency between the primary resonance coil 221 and the secondary resonance coil 111, and the like, such that a Q value (for example, Q>100) that indicates resonance strength between the primary resonance coil 221 and the secondary resonance coil 111, κ that indicates the degree of coupling therebetween, and the like, increase.

The capacitor 222 is connected to both ends of the primary resonance coil 221, and forms an LC resonance circuit together with the primary resonance coil 221. The capacitance of the capacitor 222 is appropriately set so as to attain a predetermined resonance frequency on the basis of the inductance of the primary resonance coil 221. Note that, when a desired resonance frequency is obtained by a stray capacitance of the primary resonance coil 221 itself, the capacitor 222 may be omitted.

The primary coil 223 is provided coaxially with the primary resonance coil 221, and is able to be magnetically coupled to the primary resonance coil 221 through electromagnetic induction. The primary coil 223 transmits high-frequency electric power, supplied through the matching transformer 260, to the primary resonance coil 221 through electromagnetic induction.

As described above, the communication unit 230 is a communication interface for carrying out wireless communication between the power transmitting device 200 and the vehicle 100. The communication unit 230 receives the battery information INFO and the signal STRT or STP for instructions to start or stop transmission of electric power, transmitted from the communication unit 160 of the vehicle 100, and outputs these pieces of information to the power transmission ECU 240. In addition, the communication unit 230 receives the signal COMP, which indicates completion of impedance adjustment from the matching transformer 260, from the power transmission ECU 240, and outputs the signal COMP to the vehicle 100.

The power transmission ECU 240 includes a CPU, a storage device and an input/output buffer (which are not shown in FIG. 1). The power transmission ECU 240 inputs signals from sensors, or the like, and outputs control signals to various devices to thereby control various devices in the power supply device 210. Note that control over the devices are not only limited to processing by software but may also be processed by exclusive hardware (electronic circuit).

Next, contactless power supply through electromagnetic resonance (hereinafter, also referred to as resonance method) will be described with reference to FIG. 5 and FIG. 6.

Figure 5:
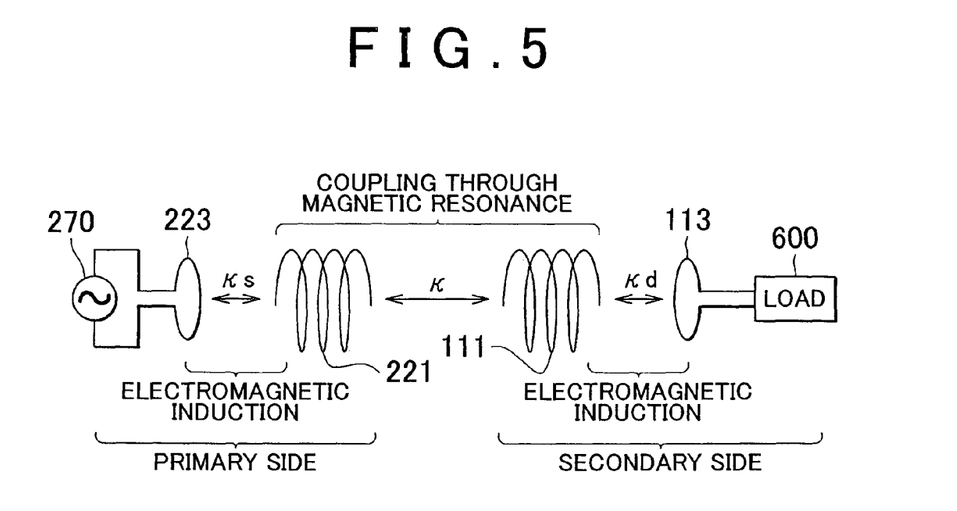
FIG. 5 is a view for illustrating the principle of power transmission using a resonance method.

FIG. 5 is a view for illustrating the principle of power transmission using a resonance method. As shown in FIG. 5, in this resonance method, as in the case where two tuning forks resonate with each other, two LC resonance coils having the same natural frequency resonate with each other in an electromagnetic field (near field) to thereby transfer electric power from one of the resonance coils to the other one of the resonance coils through the electromagnetic field.

Specifically, the primary coil 223 that is an electromagnetic induction coil is connected to the power supply device 210, and high-frequency electric power having a frequency of 1 MHz to several tens of MHz is supplied to the primary resonance coil 221, magnetically coupled to the primary coil 223, through electromagnetic induction. The primary resonance coil 221 is an LC resonator formed of the inductance of the coil itself and the stray capacitance or the capacitor (not shown) connected to both ends of the coil, and resonates with the secondary resonance coil 111 using an electromagnetic field (near field) having the same natural frequency as the primary resonance coil 221. Then, energy (electric power) is transferred from the primary resonance coil 221 to the secondary resonance coil 111 via the electromagnetic field. Energy (electric power) transferred to the secondary resonance coil 111 is extracted through electromagnetic induction by the secondary coil 113, which is an electromagnetic induction coil magnetically coupled to the secondary resonance coil 111, and is supplied to a load 600. Power transmission using a resonance method is carried out when the Q value that indicates resonance strength between the primary resonance coil 221 and the secondary resonance coil 111 is, for example, larger than 100. Note that the load 600 in FIG. 5 corresponds to devices located downstream of the rectifier 180 in FIG. 1.

Figure 6:
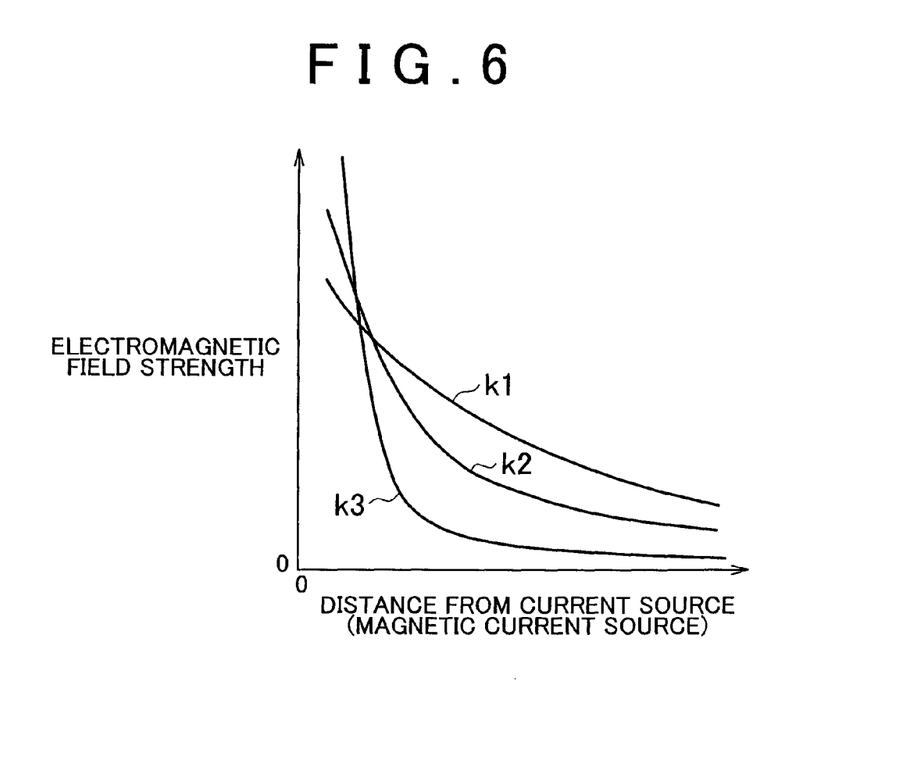
FIG. 6 is a graph that shows the correlation between a distance from a current source (magnetic current source) and the strength of an electromagnetic field.

FIG. 6 is a graph that shows the correlation between a distance from a current source (magnetic current source) and the strength of an electromagnetic field. As shown in FIG. 6, the electromagnetic field includes three components. The curve k1 is a component inversely proportional to a distance from a wave source, and is referred to as "radiation field". The curve k2 is a component inversely proportional to the square of a distance from a wave source, and is referred to as "induction field". In addition, the curve k3 is a component inversely proportional to the cube of a distance from a wave source, and is referred to as "static field".

Among these, there is a region in which the strength of electromagnetic field steeply reduces with a distance from a wave source, and, in a resonance method, this near field (evanescent field) is utilized to transfer energy (electric power). That is, by resonating a pair of resonators (for example, a pair of LC resonance coils) having the same natural frequency utilizing a near field, energy (electric power) is transferred from one resonator (primary resonance coil) to the other resonator (secondary resonance coil). This near field does not propagate energy (electric power) to a far place, so, in comparison with an electromagnetic wave that transfers energy (electric power) by the "radiation field" that propagates energy to a far place, the resonance method is able to transmit electric power with a less energy loss.

In the above described power supply system, while electric power is being transmitted from the power transmitting device 200 to the vehicle 100, when there occurs an abnormality in, for example, the electrical storage device 190 of the vehicle 100 and, therefore, the electrical storage device 190 cannot be charged, the vehicle ECU 300 immediately outputs a command STP for stopping power transmission operation to the power transmitting device 200 via the communication unit 160.

In response to the received power transmission stop signal STP, the power transmission ECU 240 stops supply of electric power from the high-frequency power supply unit 250. However, there may be a delay of communication between the vehicle 100 and the power transmitting device 200, so supply of electric power continues in a very short period of time during the delay of communication.

In addition, in power transfer using a resonance method, electromagnetic energy is stored at portions at which electromagnetic resonance is occurring between the power transmitting unit 220 and the power receiving unit 110, and, even when supply of electric power from the power supply device 210 stops, electromagnetic energy remains between the power transmitting unit 220 and the power receiving unit 110. Furthermore, as shown in FIG. 3 and FIG. 4, within the power supply device 210 as well, the high-frequency power supply unit 250 and the matching transformer 260 include a capacitor and a reactor, so electric energy is stored in these elements.

Therefore, even when power transmission operation in the power transmitting device 200 is stopped, electric power in a certain amount remains between the power transmitting device 200 and the vehicle 100. Then, in the vehicle 100, even after power transmission operation of the power transmitting device 200 is stopped, remaining electric power is supplied to the electrical storage device 190 or the capacitor C1. This may cause degradation or breakage of devices. Furthermore, when these pieces of energy continue to resonate between the power transmitting unit 220 and the power receiving unit 110, it may influence surroundings.

Then, in the first embodiment, when the power receiving mechanism of the vehicle 100 has an abnormality that disables power reception, the vehicle ECU 300 uses the discharging unit 186 and relay RY20 of the rectifying unit 180 to execute control such that the power receiving mechanism is appropriately protected by preventing supply of electric power to the power receiving mechanism having an abnormality.

More specifically, when there is an abnormality in the power receiving mechanism, the power transmission stop signal STP is transmitted to the power transmitting device 200, the relay RY20 is opened, and supply of electric power to devices adjacent to the electrical storage device 190 with respect to the capacitor C1 is interrupted. After that, the relay RY10 of the discharging unit 186 is closed, and remaining electric power is consumed by the resistor R10.

Figure 7:
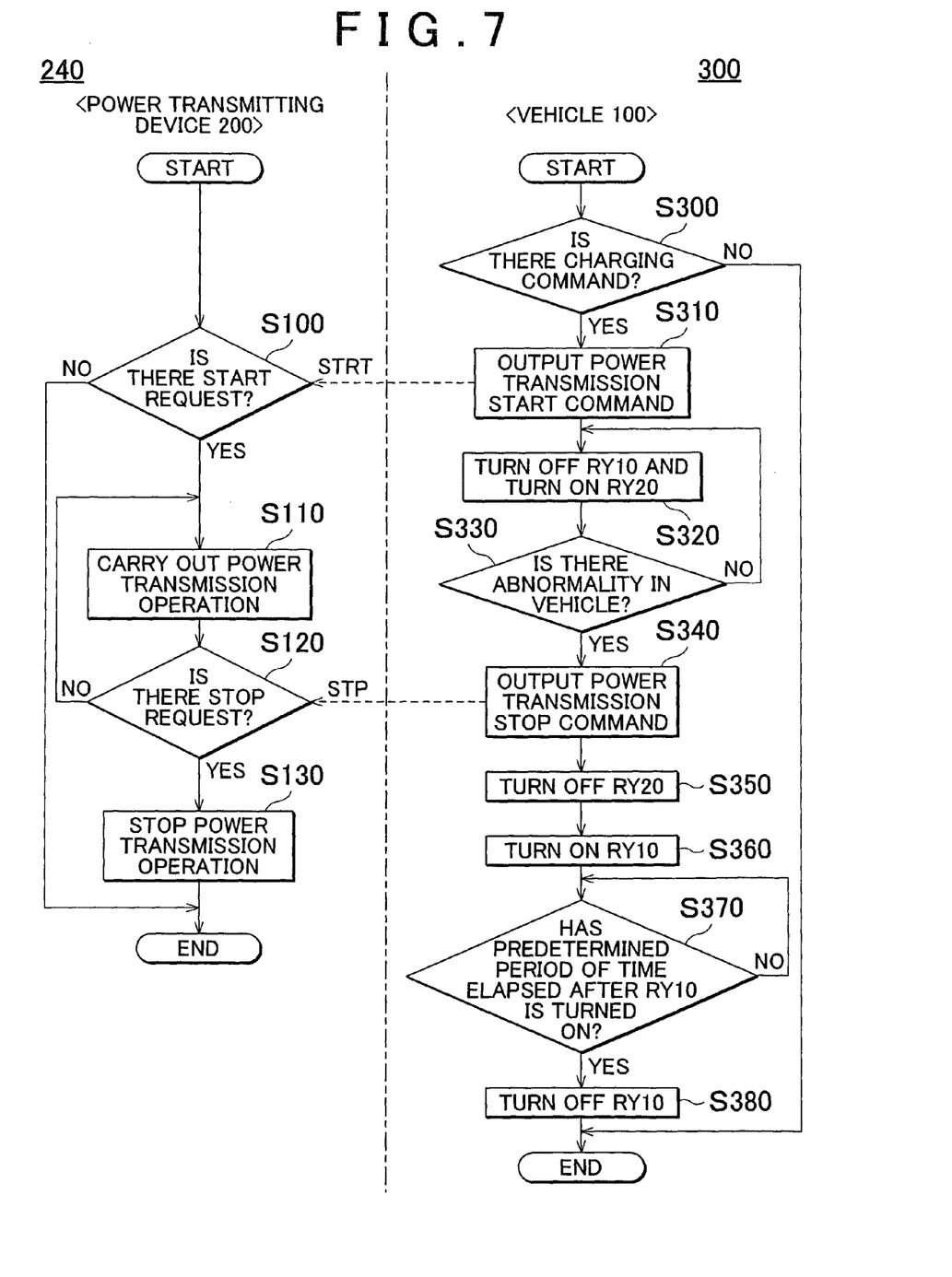
FIG. 7 is a flow chart for illustrating abnormal-time discharge control process executed by a power transmitting ECU and a vehicle ECU in the first embodiment of the invention.

FIG. 7 is a flow chart for illustrating abnormal-time discharge control process executed by the power transmission ECU 240 and the vehicle ECU 300 in the first embodiment.

The flow chart shown in FIG. 7 is implemented by executing programs prestored in the power transmission ECU 240 and the vehicle ECU 300 at predetermined intervals. Alternatively, for part of steps, the process may be implemented by constructing an exclusive hardware (electronic circuit).

First, the process executed by the vehicle ECU 300 of the vehicle 100 will be described. Referring to FIG. 2 and FIG. 7, after the vehicle 100 stops at a predetermined stop position above the power transmitting unit 220, the vehicle ECU 300 determines in step (hereinafter, step is abbreviated as "S") 300 whether the charging start command indicated by the charging start signal TRG based on user's operation, or the like, has been received.

When the charging start command has not been received (NO in S300), the vehicle ECU 300 skips the following process and ends the process.

When the charging start command has been received (YES in S300), the process proceeds to S310, and then the vehicle ECU 300 outputs the power transmission start signal STRT to the power transmitting device 200 via the communication unit 160. In the power transmitting device 200, power transmission operation is started in response to the power transmission start signal STRT.

Then, in S320, the vehicle ECU 300 turns off the relay RY10, and turns on the relay RY20. By so doing, received electric power received by the power receiving unit 110 is supplied to the electrical storage device 190 to start charging the electrical storage device 190. While the electrical storage device 190 is being charged, the vehicle ECU 300 determines whether there is an abnormality in the charging mechanism of the vehicle 100 (S330).

When there is no abnormality in the charging mechanism of the vehicle 100 (NO in S330), the process returns to S320, and charging of the electrical storage device 190 is continued. Although not shown in FIG. 7, when charging of the electrical storage device 190 has been normally completed without any abnormality in the charging mechanism, the vehicle ECU 300 outputs the power transmission stop signal STP to the power transmitting device 200 to stop power transmission operation.

On the other hand, when it is determined that there is an abnormality in the charging mechanism of the vehicle 100 (YES in S330), the process proceeds to S340, and the vehicle ECU 300 outputs the power transmission stop signal STP to the power transmitting device 200.

After that, the vehicle ECU 300 opens the relay RY20 to interrupt supply of electric power to the charging mechanism in S350, and further closes the relay RY10 of the discharging unit 186 to consume remaining electric power using the resistor R10 in S360.

Subsequently, in S370, the vehicle ECU 300 determines whether a predetermined period of time has elapsed from when the relay RY10 is closed. The predetermined period of time may be, for example, a period of time that is set in advance on the basis of a period of time during which a possible maximum remaining electric power may be discharged using the resistor R10 to a predetermined level or below. Alternatively, it is also applicable that, while the voltage applied to the resistor R10 and the current flowing through the resistor R10 are monitored, and it is determined that the predetermined period of time has elapsed on the basis of the fact that those values decrease to a level below a predetermined threshold.

When the predetermined period of time has not elapsed (NO in S370), the process returns to S370, and the vehicle ECU 300 waits until the predetermined period of time elapses.

When the predetermined period of time has elapsed (YES in S370), the process proceeds to S380, and the vehicle ECU 300 opens the relay RY10 to end the process.

Next, the process executed by the power transmission ECU 240 will be described. Referring back to FIG. 2 and FIG. 7, in S100, the power transmission ECU 240 determines whether a power transmission start request is issued from the vehicle 100 by the power transmission start signal STRT from the vehicle 100.

When no power transmission start request is issued (NO in S100), the power transmission ECU 240 skips the following process and ends the process.

When a power transmission start request is issued (YES in S100), the process proceeds to S110, and the power transmission ECU 240 drives the high-frequency power supply unit 250 and carries out impedance matching using the matching transformer 260 to thereby carry out power transmission operation.

Then, in S120, the power transmission ECU 240 determines whether a power transmission stop request is issued from the vehicle 100 by the power transmission stop signal STP from the vehicle 100.

When, no power transmission stop request is issued (NO in S120), the process returns to S110, and the power transmission ECU 240 continues power transmission operation until the power transmission stop signal STP is transmitted.

When a power transmission stop request is issued (YES in S120), the power transmission ECU 240 stops the high-frequency power supply unit 250 to stop power transmission operation in S130.

By executing control in accordance with the above described process, when there is an abnormality in the charging mechanism of the vehicle, supply of electric power to the charging mechanism is interrupted, and electric power remaining in the power transmitting device and the vehicle is appropriately discharged. By so doing, the charging mechanism of the vehicle may be appropriately protected, and it is possible to reduce the possible influence of remaining electric power on surroundings.

Second Embodiment

In the first embodiment, the configuration that the discharging unit 186 is provided in the direct-current circuit between the rectifier 185 and the electrical storage device 190 is described.

Figure 8:
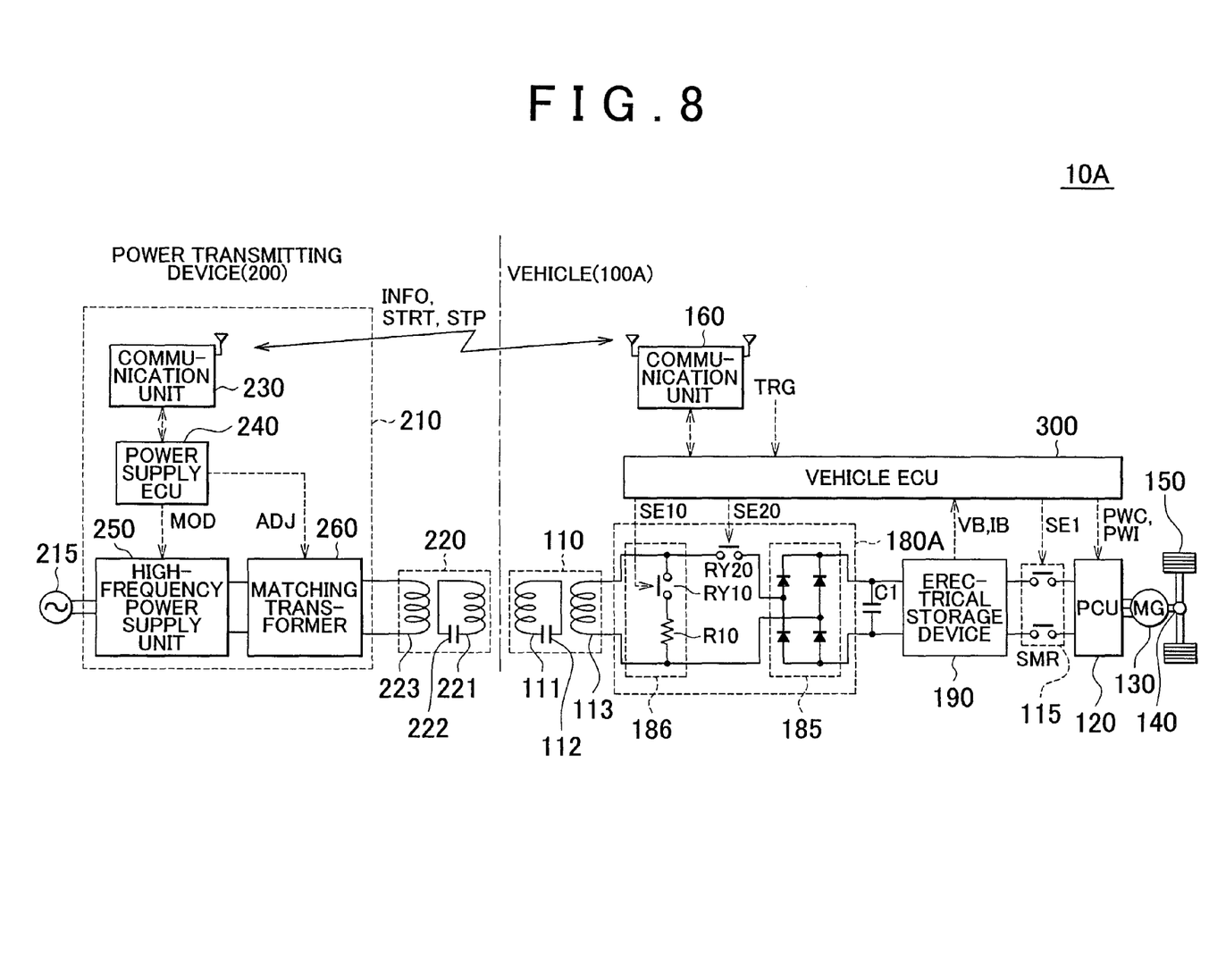
FIG. 8 is a detailed configuration view of a power supply system according to a second embodiment of the invention.

In a second embodiment, the configuration that the discharging unit 186 is provided in an alternating-current circuit between the power receiving unit 110 and the rectifier 185 will be described.

FIG. 8 is a detailed configuration view of a power supply system 10A according to the second embodiment. The power supply system 10A of FIG. 8 differs from the power supply system 10 of the first embodiment shown in FIG. 2 in that a vehicle 100A includes a rectifying unit 180A instead of the rectifying unit 180. In FIG. 8, the description of elements that overlap with those of FIG. 2 is not repeated.

As shown in FIG. 8, the rectifying unit 180A is connected between the power receiving unit 110 and the electrical storage device 190. The rectifying unit 180A, as well as the rectifying unit 180 of FIG. 2, includes a rectifier 185, a discharging unit 186 and a relay RY20.

The rectifier 185 rectifies alternating-current power, received by the power receiving unit 110, and outputs the rectified direct-current power to the electrical storage device 190.

The discharging unit 186 is connected between a pair of power lines that connect the power receiving unit 110 to the rectifier 185. The relay RY20 is inserted in one of the power lines that connect the discharging unit 186 to the rectifier 185.

When an abnormality that disables power reception occurs in the charging mechanism of the vehicle and power transmission is stopped, excessive voltage may be applied to a diode included in the rectifier 185 because of remaining electric power. Therefore, as in the case of the second embodiment, when the discharging unit 186 is provided in the alternating-current circuit between the rectifier 185 and the power receiving unit 110, it is possible to protect devices, including the rectifier, from remaining electric power in the case where there occurs an abnormality in the charging mechanism.

In the present embodiments, the discharging unit is provided for the power receiving device; instead, the discharging unit may be provided for the power transmitting device (power transmitting side). In addition, in the above description, electric power is supplied from the power transmitting device to the vehicle; however, even when electric power from the electrical storage device of a vehicle is supplied to a system power supply side as in the case of a smart grid, the aspect of the invention may be applied to take measures in the event of occurrence of an abnormality.

In addition, in the above description, an example in which the power transmitting unit and the power receiving unit include the resonance coils and electromagnetic induction coils (the primary coil and the secondary coil) is described; instead, the aspect of the invention may also be applied to a resonance system that is configured such that the power transmitting unit and the power receiving unit have no electromagnetic induction coils. In this case, for example, in FIG. 2, at the side of the power transmitting device 200, the primary resonance coil 221 is coupled to the matching transformer 260 without intervening the primary coil 223, and, at the side of the vehicle 100, the secondary resonance coil 111 is coupled to the rectifier 180 without intervening the secondary coil 113.

The embodiments described above are illustrative and not restrictive in all respects. The scope of the invention is defined by the appended claims rather than the above description. The scope of the invention is intended to encompass all modifications within the scope of the appended claims and equivalents thereof.

The invention claimed is:

1. A power receiving device for contactlessly receiving electric power, transferred from a power transmitting device, through electromagnetic resonance, comprising:
    a power receiving unit configured to carry out electromagnetic resonance with a power transmitting unit included in the power transmitting device to receive electric power from the power transmitting device;
    a discharging unit configured to discharge received electric power received by the power receiving unit when there is an abnormality in the power receiving device;
    an electrical storage device configured to store the received electric power; and
    a rectifier configured to rectify the received electric power, wherein
    the discharging unit is connected between a pair of power lines that connect the rectifier to the electrical storage device.

2. The power receiving device according to claim 1, wherein
    the discharging unit is configured to consume the received electric power to suppress supply of the received electric power to the electrical storage device when there is the abnormality in the power receiving device.

3. The power receiving device according to claim 2, wherein
    the discharging unit includes a resistor that discharges the received electric power.

4. The power receiving device according to claim 3, wherein
    the resistor is used at the time of determining a relative position between the power transmitting device and the power receiving device.

5. The power receiving device according to claim 3, further comprising: a control unit configured to control the discharging unit, wherein
    the discharging unit further includes a first switching unit that is connected in series with the resistor, and
    the control unit is configured to place the first switching unit in a conductive state when the received electric power is discharged, and places the first switching unit in a non-conductive state when the received electric power is not discharged.

6. The power receiving device according to claim 5, wherein
    the control unit is configured to place the first switching unit in the non-conductive state when a predetermined period of time during which the received electric power is discharged by the discharging unit to a level below a predetermined threshold from when the first switching unit is placed in the conductive state has elapsed.

7. The power receiving device according to claim 1, further comprising:
    a control unit configured to control the discharging unit; and
    a second switching unit provided in one of the power lines that connect the discharging unit to the electrical storage device, wherein
    the control unit configured to place the second switching unit in a conductive state when the electrical storage device is charged with the received electric power, and places the second switching unit in a non-conductive state when the received electric power is discharged.

8. The power receiving device according to claim 1, further comprising:
    a control unit configured to control the discharging unit; and
    a second switching unit provided in one of the power lines that connect the discharging unit to the rectifier, wherein
    the control unit is configured to place the second switching unit in a conductive state when the electrical storage device is charged with the received electric power, and places the second switching unit in a non-conductive state when the received electric power is discharged.

9. A vehicle comprising:
    the power receiving device according to claim 1; and
    a driving device configured to use electric power received by the power receiving device to generate running driving force.

10. A power transmitting device for contactlessly transferring electric power to a power receiving device through electromagnetic resonance, comprising:
    a power transmitting unit configured to carry out electromagnetic resonance with a power receiving unit included in the power receiving device to transfer electric power;
    a power supply device configured to supply electric power to the power transmitting unit; and a control unit configured to control power transmission in the power supply device, wherein the power receiving device includes:
- a discharging unit that discharges received electric power received by the power receiving unit when there is an abnormality in the power receiving device,
- an electrical storage device configured to store the received electric power; and
- a rectifier configured to rectify the received electric power, wherein
- the discharging unit is connected between a pair of power lines that connect the rectifier to the electrical storage device, and the control unit is configured to stop the power transmission in response to a signal that indicates instructions for stopping the power transmission and that is received from the power receiving device when the received electric power is discharged by the discharging unit.

11. A contactless power supply system for contactlessly transferring electric power through electromagnetic resonance, comprising:

a power transmitting device including a power transmitting unit;

a power receiving device including a power receiving unit that carries out electromagnetic resonance with the power transmitting unit; and a control unit configured to control transfer of electric power from the power transmitting device to the power receiving device, wherein the power receiving device includes;
- a discharging unit that discharges received electric power received by the power receiving unit when there is an abnormality in the power receiving device;
- an electrical storage device configured to store the received electric power; and
- a rectifier configured to rectify the received electric power, wherein
- the discharging unit is connected between a pair of power lines that connect the rectifier to the electrical storage device.

* * * * *